United States Patent Office 3,281,321
Patented Oct. 25, 1966

3,281,321
ACETAMIDIDO-(THIO)-PHOSPHORIC OR PHOSPHONIC ACID ESTERS AS RODENTICIDES
Hugo Malz, Leverkusen-Wiesdorf, and Günther Hermann, Leverkusen, Germany, assignors to Farbenfabriken Bayer Aktiengesellschaft, Leverkusen, Germany, a corporation of Germany
No Drawing. Filed Aug. 20, 1963, Ser. No. 303,397
Claims priority, application Germany, Aug. 23, 1962, F 37,654
9 Claims. (Cl. 167—46)

The present invention relates to and has as its objects a new method of combating rodents, especially rats and mice as well as rodenticidal compositions. More specifically this invention is concerned with compositions for combating rodents containing as active ingredients acetamidido-(thio)-phosphoric or -phosphonic acid esters of the general formula

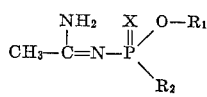

wherein $R_1$ stands for an aromatic halohydrocarbon radical, $R_2$ stands for an alkyl, aryl, alkoxy or an optionally halogen-substituted aroxy group, or a radical of a primary or secondary aliphatic, cycloaliphatic, aromatic or heterocyclic amine and X is an oxygen or sulfur atom.

In recent years the protection of agricultural and forestry seed against attack by rodents has attained considerable importance, especially since in some countries re-afforestation has started to be carried out by sowing the seeds from aircraft. The protection of the seeds against damage by rodent animals is possible by impregnating the seeds with deterrent but non-poisonous substances; it appears, however, that the initially good repellent effect wears off if a food shortage for the pests occurs; moreover these repellents mostly protect only the grain treated with them, but not the seedlings which are likewise liable to attack. Apart from the deterrent substances, therefore, preparations are today still used with success which have the effect of killing the rodent pests. The applications of these rodenticides is carried out either by a surface poisoning method or in the form of baits. The effectiveness of the bait poison, assuming complete acceptance by the animal pest, depends on their toxicity. The optimum to be desired is a selectively effective substance which offers a smaller risk to wild animals, useful animals and man than to the pests to be combated. Furthermore, the active substance in the bait material must be stable for at least a certain time.

In the course of experiments continued for some years regarding the applicability of organic (thio)phosphoric or amido-(thio) phosphoric acid drivatives as rodenticides in baits, it has increasingly been found that the application of the aforementioned group of compounds is not possible by one or more of the reasons indicated above. This was especially apparent, in that most of the active substances belonging to the above mentioned compound class possess, when applied in a rodenticidally effective dose, such a strong repellent effect on the pest that satisfactory destruction of the rodent pest population was not achieved. It was moreover found that the mainly green-stuff eating short-tailed mice are very little sensitive to the organic (thio-) phosphoric or amido-(thio-) phosphoric acid compounds which were found very effective against rats and mice in laboratory experiments. This also applies in the case of rodenticides disclosed in U.S. Patent specification 2,994,638. Thus, for example, the mean per oral toxicity ($LD_{50}$) of N,N-dimethyl-amido phosphoric acid-O,O-(4,4'-dichlorodiphenyl) ester on the common vole (Microtus arvalis) amounts to about 125 milligrams per kilogram of animal weight, the value for the corresponding N,N-diethyl compound lies at about 150 milligrams per kilogram of animal; on the other hand, both compounds show a mean per oral toxicity ($LD_{50}$) of 10 milligrams per kilogram of animal weight against the white laboratory mouse in the throat probe test. The fact that the above mentioned amido-phosphoric acid derivatives are nevertheless suitable for combating field mice, depends on the particular way of applying the active agents by the surface poisoning method, in which, apart from the per oral activity, the action as a contact poison, and possibly as an inhalation poison, is of special importance.

In accordance with the present invention it has now been found, surprisingly, that acetamidido-phosphoric or -thio-phosphoric (or -phosphonic) acid esters of the general formula

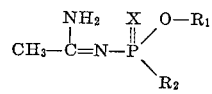

in which $R_1$ stands for an aromatic halohydrocarbon radical, $R_2$ stands for an alkyl, aryl, alkoxy or an optionally halogen-substituted aroxy group or a radical of a primary or secondary aliphatic, aromatic, cycloaliphatic or heterocyclic amine and X is an oxygen or sulfur atom, are suitable in an outstanding manner as agents for combating rodent pests, without the disadvantageous properties referred to above of other phosphorus compounds becoming manifest.

It has been shown by laboratory and field experiments on rats, mice and voles (field mice) that the preparations to be employed according to the invention possess good acceptance as well as extraordinary high poison values on rodent pests, without any decrease of activity being observed among species feeding on green-stuff. For example, when applying P-acetamidido-O,O-(4,4'-dichlorodiphenyl)-thionophosphoric acid ester of the formula

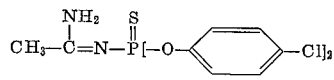

the following values were obtained of the mean per oral toxicity ($LD_{50}$) (in milligrams per kilogram of animal weight):

Brown (Norway) rat (Rattus norvegicus) _____ 25
House mouse (Mus musculus) _____ 20
Common vole (Microtus arvalis) _____ 15
Mountain pocket gopher (Thomomys talpoides) ____ 2

The above figures clearly show that the poisonous action of the compounds to be applied according to the invention is especially good against short-tailed mice and rodents eating green-stuff. For this reason the preparations can also be employed as surface poisons. Their low toxicity to fish in comparison with chlorinated diene adducts (e.g. mean lethal concentration ($LC_{50}$) on the guppy=5 p.p.m.) and the lack of damaging properties to plants even at the rodenticidally fully effective dose of 0.1% of active ingredient in aqueous suspension causes this class of compounds to appear likewise especially suitable for the last mentioned manner of application.

The acetamidido-phosphoric or -thiophosphoric (or -phosphonic) acid esters to be employed according to the invention as rodenticides can be produced according to methods known in principle e.g. by reacting the corresponding (thiono)-phosphoric acid-O,O-di- or (thiono)-phosphonic acid-O-mono- or amido-(thiono)-phosphoric acid-O-mono-ester halides with acetamidine.

Compounds especially applicable as rodenticides include the following:

(a) P-acetamidido-(thiono-)phosphoric acid-bis-O,O-halophenyl esters of the general formula $$\begin{array}{c} NH_2 \quad X \\ | \quad \| \\ CH_3-C=N-P \end{array} \left[ -O-\underset{}{\bigcirc}-Hal_n \right]_2$$

wherein Hal stands for the same or different halogen atoms, especially chlorine or bromine, X denotes an oxygen or sulfur atom and $n$ is a whole number from 1 to 5.

(b) P-acetamidido-(thiono-)-phosphoric acid-O-alkyl-O-halophenyl esters of the formula $$\begin{array}{c} NH_2 \quad X \quad O-R_3 \\ | \quad \| \; / \\ CH_3-C=N-P \\ \qquad \qquad \backslash \\ \qquad \qquad O-\underset{}{\bigcirc}-Hal_n \end{array}$$

in which $R_3$ stands for an optionally substituted alkyl radical, while Hal, $n$ and X have the same significance as given above under (a);

(c) P-acetamidido-(thiono)-alkyl or -aryl-phosphonic acid-O-halophenyl esters of the general formula $$\begin{array}{c} NH_2 \quad X \quad Y \\ | \quad \| \; / \\ CH_3-C=N-P \\ \qquad \qquad \backslash \\ \qquad \qquad O-\underset{}{\bigcirc}-Hal_n \end{array}$$

in which Hal, X and $n$ possess the same significance as given above, while Y stands for an optionally substituted alkyl or aryl radical.

(d) P-acetamidido-(thiono-)-phosphoric acid-O-halophenyl ester amides of the general formula $$\begin{array}{c} NH_2 \quad X \quad N \begin{array}{c} R' \\ \backslash \\ R'' \end{array} \\ | \quad \| \; / \\ CH_3-C=N-P \\ \qquad \qquad \backslash \\ \qquad \qquad O-\underset{}{\bigcirc}-Hal_n \end{array}$$

in which R' and R'' stand for hydrogen atoms, alkyl or aryl radicals, while Hal, X and $n$ have the same significance as given above.

The substances to be employed as rodenticides according to the invention are applied as bait material, mixed with substances which are well accepted by rodents and other pests, a combination with particular attractant materials being also possible or expedient. If the products are to be applied in the form of surface poisons, it is recommended to spray aqueous solutions or emulsions of the active ingredients which in the case of water-insoluble agents are readily prepared with the aid of commercial wetting or emulsifying agents.

The following examples are given for the purpose of illustrating the invention.

*Example 1*

In a series of experiments the killing effect of P-acetamidido - O,O-(4,4'-dichlorodiphenyl)-thiono-phosphoric acid ester is tested in comparison with an already known rodenticide. As test animals, freshly captured field specimens were used, accommodated in individual cages, of the North American types of rodent pests mentioned below; each of the test animals was given on 10 successive days 25 treated wheat grains each time besides any amount of standard food. The following experimental results were thus obtained:

| Active agent [1] | Concentration of active agent on wheat, in percent | Rodenticidal Action against— | | | |
|---|---|---|---|---|---|
| | | White-footed mouse (peromyscus maniculatus) killing rate in percent after— | | Meadow mouse (microtus pennsylvanicus) killing rate in percent after— | |
| | | 1 day | 10 days | 1 day | 10 days |
| A | 2 | 0 | 30 | | |
| A | 0.5 | | | 0 | 40 |
| B | 2 | 100 | | 100 | |
| B | 0.1 | 40 | 100 | 100 | |
| B | 0.01 | 0 | 0 | 10 | 100 |

[1] A: N,N-diethyl-O,O-(4,4'-dichlorodiphenyl)-amidophosphoric acid ester (Control preparation).
B: P-acetamidido-O,O-(4,4'-dichlorodiphenyl)-thionophosphoric acid ester.

As is apparent from the values given above, the population of meadow mice (*microtus pennsylvanicus*) is still killed with certainty with a wheat bait containing 0.01% of P - acetamidido - O,O-(4,4'-dichlorodiphenyl)-thionophosphoric acid ester.

*Example 2*

By directly feeding groats treated with P-acetamidido-O,O-(4,4' - dichlorodiphenyl) - thionophosphoric acid ester to mountain pocket gophers (*Thomomys talpoides*), which are very damaging pests from an economic point of view, the following killing effect was attained by laboratory experiments.

| Concentration of active agent in bait in percent | Killing rate of pests in percent | Number of test animals |
|---|---|---|
| 1.0 | 100 | 5 |
| 0.5 | 100 | 5 |
| 0.075 | 95 | 20 |
| 0.05 | 90 | 41 |

*Example 3*

By direct feeding on the plains gophers (*Geomys bursarius*) which is likewise a great pest, the following killing results were obtained.

| Concentration of active agent in bait in percent | Killing rate of pests in percent | Number of test animals |
|---|---|---|
| 0.1 | 100 | 5 |
| 0.05 | 80 | 5 |

*Example 4*

On a surface strongly infested (52 holes) by mountain pocket gopher (*Thomomys talpoides*), groats treated with 0.05% of P-acetamidido-O,O-(4,4'-dichlorodiphenyl)-thionophosphoric acid ester were applied underground by means of a special machine (burrow builder) in artificially produced horizontal burrows. The dose given amounted to 2.25 kilograms of bait per hectare of ground surface. A control experiment carried out 5 days later showed a decrease of infestation of 96.2%.

*Example 5*

Two common voles (*Microtus arvalis*) accommodated in individual cages were given, on pieces of apple, 15 milligrams each of P-acetamidido-O,O-(4,4'-dichlorodiphenyl)-phosphoric acid ester per kilogram of animal weight. Both animals died within 24 hours.

About the same killing effect is achieved by using P-acetamidido-O-4-chlorophenyl-O-ethyl-phosphoric acid ester.

*Example 6*

A piece of turf, of 0.1 m.² surface resting within a lattice cage, was sprayed with 20 millilitres of an aqueous suspension containing 0.05% P-acetamidido-O,O-(4,4'-dichlorodiphenyl)-thionophosphoric acid ester. Immediately after spraying, two common voles (*Microtus arvalis*) were placed on the turf. Both animals died. The rodent pests are killed in the same manner with certainty by using P-acetamidido-O-4-chlorophenyl-O-ethylthionophosphoric acid ester or P-acetamidido-O-4-chlorophenyl-O-propyl-phosphoric acid ester as active agent.

*Example 7*

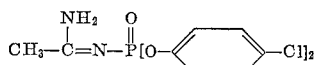

A solution of 50.6 g. of O,O-(4,4'-dichlorodiphenyl)-phosphoric acid ester chloride in 200 ml. of benzene and a solution of 12 g. of sodium hydroxide in 60 ml. of water are added dropwise at the same time from two dropping funnels to a solution of 14 g. of acetamidine-chlorohydrate in such a manner that a slight excess of the first mentioned solution is always present in the mixture. After the reaction has subsided the mixture is stirred at room temperature for about half an hour, then the benzene solution is separated, washed with water, dried over sodium sulphate and evaporated under reduced pressure. The solid distillation residue is recrystallized from a benzene/petroleum ether mixture (1:1) 47 g. of the P-acetamidido-O,O-(4,4'-dichlorodiphenyl)-phosphoric acid ester are obtained in the form of colourless crystals melting at 83° to 85° C.

*Example 8*

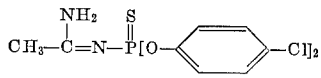

A solution of 64.25 g. of 4-chlorophenol and 52 g. of triethylamine in 125 ml. of methylene chloride is added dropwise to a solution of 42.4 g. of phosphorus sulphochloride in 125 ml. of methylene chloride with stirring and cooling with ice-water. After the reaction has subsided the mixture is stirred for a quarter of an hour and then the precipitated triethylamine-chlorohydrate is separated by washing with water. The washed solution in methylene chloride is added dropwise at temperatures between 0° and +10° C. to a solution of 23.3 g. of acetamidine-chlorohydrate in 80 ml. of water. At the same time there is added from a second dropping funnel a solution of 20 g. of sodium hydroxide in 80 ml. of water in such a way that soda lye is always present in the reaction mixture in a deficient amount. After the dropwise addition of the solutions the cooling is stopped and the mixture stirred for three quarters of an hour. During this time the temperature of the mixture rises to about 30° to 40° C. Then the methylene chloride layer is separated, washed with water and evaporated in vacuum after drying over sodium sulphate. There are obtained about 90 g. of the P-acetamidido-O,O-(4,4'-dichlorodiphenyl)-thionophosphoric acid ester in the form of a crystalline residue which is recrystallized from benzene. The colourless crystals melt at 107° to 109° C.

We claim:

1. A method of combating rodents which comprises spraying a cultivated area which is infested with rodents with an aqueous emulsion containing an effective amount of a compound of the following formula

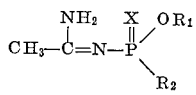

in which X stands for a member selected from the group consisting of oxygen and sulfur, $R_1$ stands for halogen-substituted phenyl; $R_2$ stands for a member selected from the group consisting of lower alkyl, lower alkoxy, phenyl, halogen-substituted phenyl, phenoxy, halogen-substituted phenoxy, amino, lower alkylamino and lower dialkylamino.

2. A method of combating rodents which comprises spraying a cultivated area which is infested with rodents with an aqueous emulsion containing an effective amount of a compound of the following formula

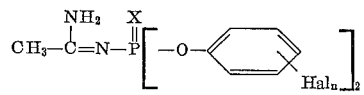

in which X stands for a member selected from the group consisting of oxygen and sulfur, Hal stands for a member selected from the group consisting of chlorine and bromine and *n* stands for an integer of from 1 to 5.

3. A method of combating rodents which comprises spraying a cultivated area which is infested with rodents with an aqueous emulsion containing an effective amount of a compound of the following formula

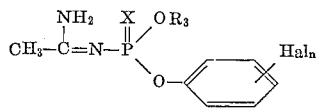

in which X stands for a member selected from the group consisting of oxygen and sulfur, $R_3$ stands for a lower alkyl having up to 4 carbon atoms and *n* stands for an integer of from 1 to 5 and Hal stands for a member selected from the group consisting of chlorine and bromine.

4. A method of combating rodents which comprises spraying a cultivated area which is infested with rodents with an aqueous emulsion containing an effective amount of a compound of the following formula

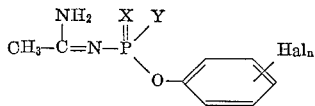

in which X stands for a member selected from the group consisting of oxygen and sulfur, Hal stands for a member selected from the group consisting of chlorine and bromine, Y stands for a member selected from the group consisting of lower alkyl, having up to 4 carbon atoms, phenyl and halogen-substituted phenyl and *n* stands for an integer of from 1 to 5.

5. A method of combating rodents which comprises spraying a cultivated area which is infested wtih rodents with an aqueous emulsion containing an effective amount of a compound of the following formula

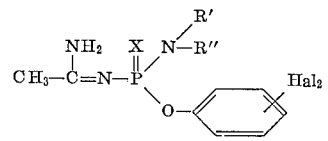

in which X stands for a member selected from the group consisting of oxygen and sulfur, Hal stands for a member selected from the group consisting of chlorine and bromine, R' and R" stand for members selected from the group consisting of hydrogen and lower alkyl having up to 4 carbon atoms, and *n* stands for an integer of from 1 to 5.

6. A method of combating rodents which comprises spraying a cultivated area which is infested with rodents with an aqueous emulsion containing an effective amount of a compound of the following formula

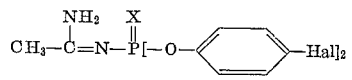

in which X stands for a member selected from the group consisting of oxygen and sulfur and Hal stands for a member selected from the group consisting of chlorine and bromine.

7. A method of combating rodents which comprises spraying a cultivated area which is infested with rodents with an aqueous emulsion containing an effective amount of a compound of the following formula

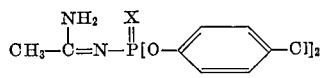

in which X stands for a member selected from the group consisting of oxygen and sulfur.

8. A method of combating rodents which comprises spraying a cultivated area which is infested with rodents with an aqueous emulsion containing an effective amount of a compound of the following formula

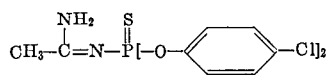

9. A method of combating rodents which comprises spraying a cultivated area which is infested with rodents with an aqueous emulsion containing an effective amount of a compound of the following formula

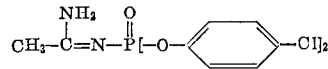

References Cited by the Examiner
UNITED STATES PATENTS

| | | | |
|---|---|---|---|
| 2,889,246 | 6/1959 | Harker | 167—46 |
| 2,994,638 | 8/1961 | Mailz et al. | 167—46 |
| 3,038,924 | 6/1962 | Schoot et al. | 260—461 |
| 3,092,544 | 6/1963 | Nault | 260—461 |

JULIAN S. LEVITT, *Primary Examiner.*

DONALD B. MOYER, VERA C. CLARKE,
*Assistant Examiners.*